United States Patent [19]

Lees et al.

[11] Patent Number: 5,108,626

[45] Date of Patent: Apr. 28, 1992

[54] PROCESS FOR RECOVERING COURSE PARTICLES FROM TAILINGS

[75] Inventors: Jeremy J. Lees, Birchgrove; Andrew J. Dalzell, Kensington; Murray H. Pryor, Roseville, all of Australia

[73] Assignee: Minpro Pty. Limited, Annadale, Australia

[21] Appl. No.: 581,708

[22] Filed: Sep. 14, 1990

[51] Int. Cl.⁵ .................. B01D 33/17; B01D 21/26; B03B 7/0

[52] U.S. Cl. .................... 210/785; 210/388; 210/413; 210/767; 210/780; 210/787; 210/512.1; 210/512.2; 210/395; 210/405; 210/211; 210/144; 209/17; 209/269; 209/346; 209/275

[58] Field of Search ........... 210/388, 413, 785, 787, 210/767, 780, 512.1, 512.2; 209/17, 269, 275, 346, 395, 405, 211, 144, 2

[56] References Cited

U.S. PATENT DOCUMENTS

| | | | |
|---|---|---|---|
| 3,817,376 | 6/1974 | Burstein | 209/275 |
| 4,128,474 | 12/1978 | Ennis | 209/2 |
| 4,219,409 | 8/1980 | Liller | 210/512.1 |
| 4,282,088 | 8/1981 | Ennis | 209/17 |
| 4,325,819 | 4/1982 | Altizer | 209/17 |
| 4,505,812 | 3/1985 | Lees | 209/269 |
| 4,519,902 | 5/1985 | Kinder | 209/269 |
| 4,865,740 | 9/1989 | Callut | 210/512.2 |

Primary Examiner—Robert A. Dawson
Assistant Examiner—David Reifsnyder
Attorney, Agent, or Firm—Fleit, Jacobson, Cohn, Price, Holman & Stern

[57] ABSTRACT

A process for the recovery of coal particles having a maximum dimension of less than 2 mm from coal tailings including the steps of forming a slurry (101) of tailings having a pulp density of from 10 to 30% by weight; feeding the slurry into a hydrocyclone (103) to produce an underflow second stream which contains the tailing particles over a predetermined size and some of the gangue particles smaller than that size and an overflow stream containing the coal particles smaller than the predetermined size and the balance of the gangue particles, the hydrocyclone (103) being operated such that the underflow stream has a pulp density of from 40% to 60% by weight; adjusting the pulp density of the second stream, if required, to from 20 to 50% by weight; passing the repulped second stream over a rapped or vibrated sieve screen deck (105) having a wedge wire sieve screen with a radius of less than 2 m, an arc angle of from 45° to 60° and a slot aperture of from 80 microns to 500 microns to form a stream of coarse particles substantialy all having a particle size greater than 65 microns; and passing the course particle stream from the sieve screen deck, after repulping to a pulp density of from 20 to 50% by weight, to a spiral separator (108) for fractionation according to density to separate the coal from the gangue.

8 Claims, 8 Drawing Sheets

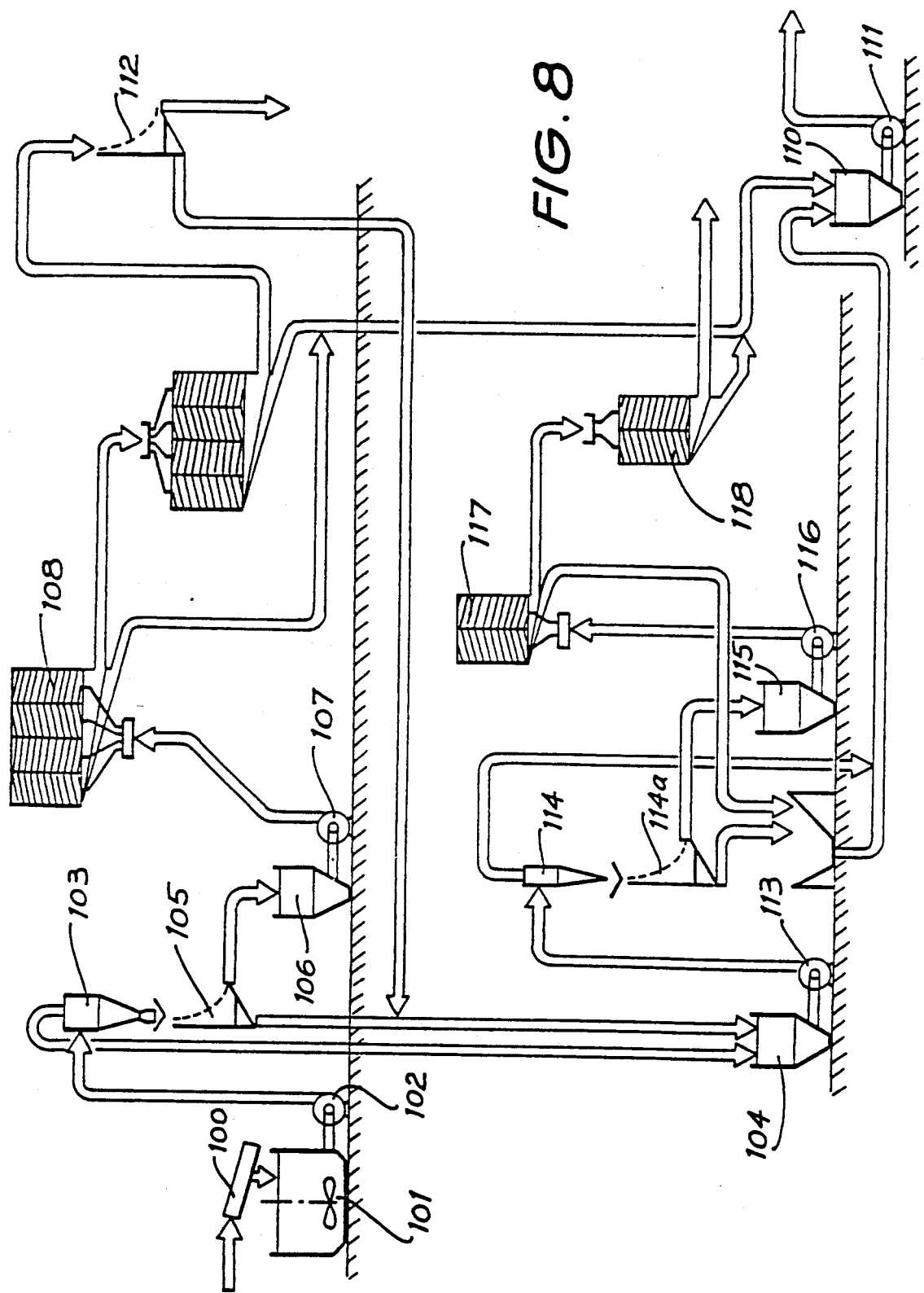

PROCESS FOR RECOVERING COURSE PARTICLES FROM TAILINGS

BACKGROUND OF THE INVENTION

The present invention relates to improvements in sieve screen decks and to a process for using sieve screen decks in the recovery of coarse particles from tailings.

Sieve screen decks are known which comprise a stationary support frame, an elongate sieve screen resiliently mounted on the frame and connected to the frame only at two opposite ends of the sieve screen, and rapping and vibrating means adapted to apply a rapping or vibrating force to the sieve screen. These known sieve screen decks suffer from a number of disadvantages including deficiencies in the rapping or vibrating means. The rapping or vibrating means has been mounted on the underside of the sieve screen and has been susceptible to damage due to the ingress of water and fine particulate matter. As sieve screens are generally not flat across their width difficulty has also been experienced in applying a rapping or vibrating force evenly to the sieve screen across its full width.

Sieve screen decks have been used to separate fine particulate materials from coarse particulate materials and for dewatering slurries of particulate materials. Typical applications have included separating slimes, i.e. very fine particles, from mineral slurries. A problem which has been encountered is that if the mineral slurry being sieved includes a high proportion of slimes the rate of sieving is uneconomically slow. Because of this it has been conventional to use hydrocyclones rather than sieve screen decks to bring about the separation of slimes from mineral slurries. However hydrocyclones operate in such a way that small dense particles tend to fractionate together with larger, less dense particles. This means that the fraction of larger particles tends to be contaminated with smaller particles of higher density.

BRIEF SUMMARY OF THE INVENTION

In a first aspect the present invention consists in a sieve screen deck comprising a stationary support frame, an elongate sieve screen resiliently mounted on the frame and being connected to the frame only at two opposite ends of the sieve screen and rapping or vibrating means adapted to apply a rapping or vibrating force to the sieve screen, characterized in that the rapping or vibrating means comprises a motor mounted on the support frame above the sieve screen and driving a suitably profiled cam, a cam follower bearing against the cam, an elongate torque transfer member connected at one end to the cam follower and at the other end to a rapping bar pivotally mounted beneath the sieve screen such that the rotation of the cam causes the application of the rapping or vibrating force to the sieve screen by the rapping bar.

In a preferred embodiment of the invention each cam is provided with a pair of cam followers, each cam follower driving, through an appropriate elongate torque transfer member, a separate sieve screen. Thus, each cam can cause a rapping or vibrating force to be applied to a pair of sieve screens. In a further preferred embodiment of the invention each motor drives a pair of cams each of which applies a rapping or vibrating force to a pair of sieve screens. In this arrangement if the cams and cam followers are suitably offset relative to one another the peak load on the motor and the drive to the cams will not be greater than if only a single sieve screen were being rapped or vibrated. It is particularly preferred that the length of the elongate torque transfer member may be varied such that the rapping or vibrating force and/or periodicity may be varied for a given cam.

In a further aspect the present invention consists in a sieve screen deck comprising a stationary support frame, an elongate sieve screen resiliently mounted on the frame and being connected to the frame only at two opposite ends of the sieve screen, and rapping or vibrating means adapted to apply a rapping or vibrating force to the sieve screen, characterized in that the sieve screen carries on its underside, intermediate its ends, a strip of a resilient material extending substantially normal to the longitudinal axis of the sieve screen, the resilient strip being adapted to receive a rapping or vibrating force applied to the sieve screen and being adhered to the sieve screen by a gap filling adhesive such that the surface of the strip distal to the sieve screen is substantially planar.

In a still further aspect the present invention consists in a method for applying to a sieve screen a strip of a resilient material to receive a rapping or vibrating force applied to the sieve screen comprising releasably connecting one face of the strip to a substantially planar support member, applying a gap filling adhesive to the other side of the strip or to the underside of the sieve screen, bringing the strip and the sieve screen together such that the adhesive is therebetween, allowing the adhesive to cure and removing the support member from the strip.

It is preferred that the resilient material is rubber or a synthetic plastics material. However, other materials such as leather could be used. The adhesive is preferably a silicone sealant or a polymeric. However, other water resistant, gap filling, i.e. non shrinking, adhesive could be used.

The present invention, in a yet further aspect, consists in a process for the recovery of coarse particles from tailings having a particle size of less than 2 mm, wherein the improvement is characterized in that the process includes the steps of:

1) forming a slurry of the tailings having a pulp density of from 10 to 30% by weight, 2) feeding the slurry into a hydrocyclone to produce a stream containing fine particles and a stream containing coarse particles having a pulp density of from 40 to 60% by weight, 3) adjusting the pulp density of the stream of coarse particles, if required, to from 20 to 50% by weight, 4) passing the repulped coarse stream over a rapped or vibrated sieve screen deck having a wedge wire sieve screen with a radius of less than 2 m, an arc angle of from 45° to 60° and a slot aperture of from 80 microns to 500 microns to form a coarse stream of particles substantially all having a particle size of greater than 65 microns.

This method is particularly applicable to the recovery of coal particles from tailings from a conventional coal washery. In this method the sieve screen deck may be according to one of the aspects of the present invention or may be a conventional sieve screen deck to the type described as being known in the introductory part of this specification.

The coarse stream from the sieve screen deck may be passed, after suitable repulping, to a spiral separation for fractionation according to density to separate mineral values from gangue.

The steps according to the improvement in the method can also be carried out on mineral values which have already been separated from gangue to rid the mineral values of slimes formed during processing and to dewater the mineral values. In this case the coarse stream from the sieve screen deck is fed to a further dewatering device such as a centrifuge.

BRIEF DESCRIPTION OF THE DRAWINGS

Hereinafter given by way of example only is a preferred embodiment of the present invention described with reference to the accompanying drawings wherein:

FIG. 8 is a flow diagram showing the method according to a third aspect of the present invention.

DETAILED DESCRIPTION OF A PREFERRED EMBODIMENT OF THE INVENTION

Figure 1:
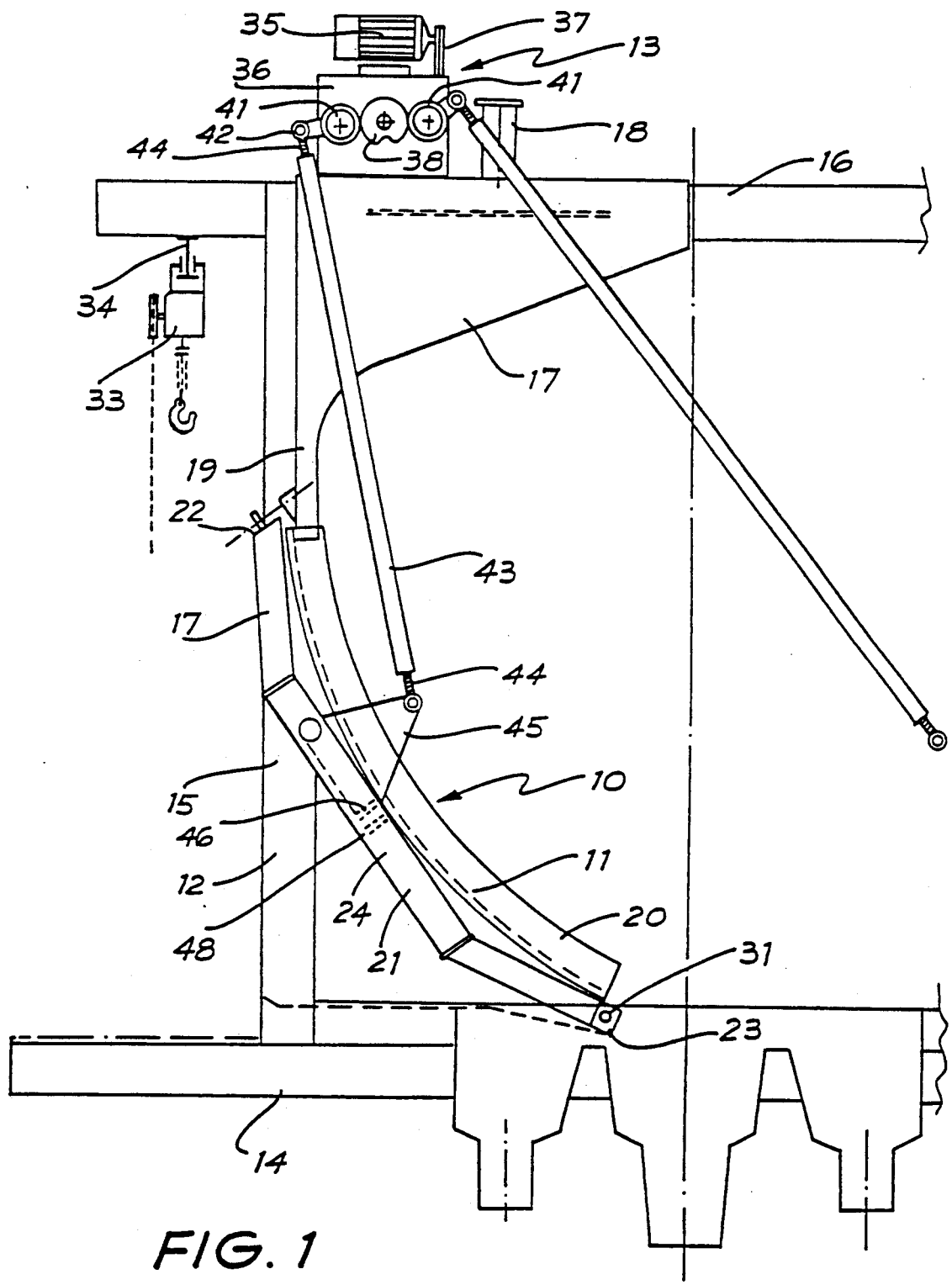
FIG. 1 is a schematic side elevational view of a sieve deck according to the first aspect of the present invention.
Figure 2:
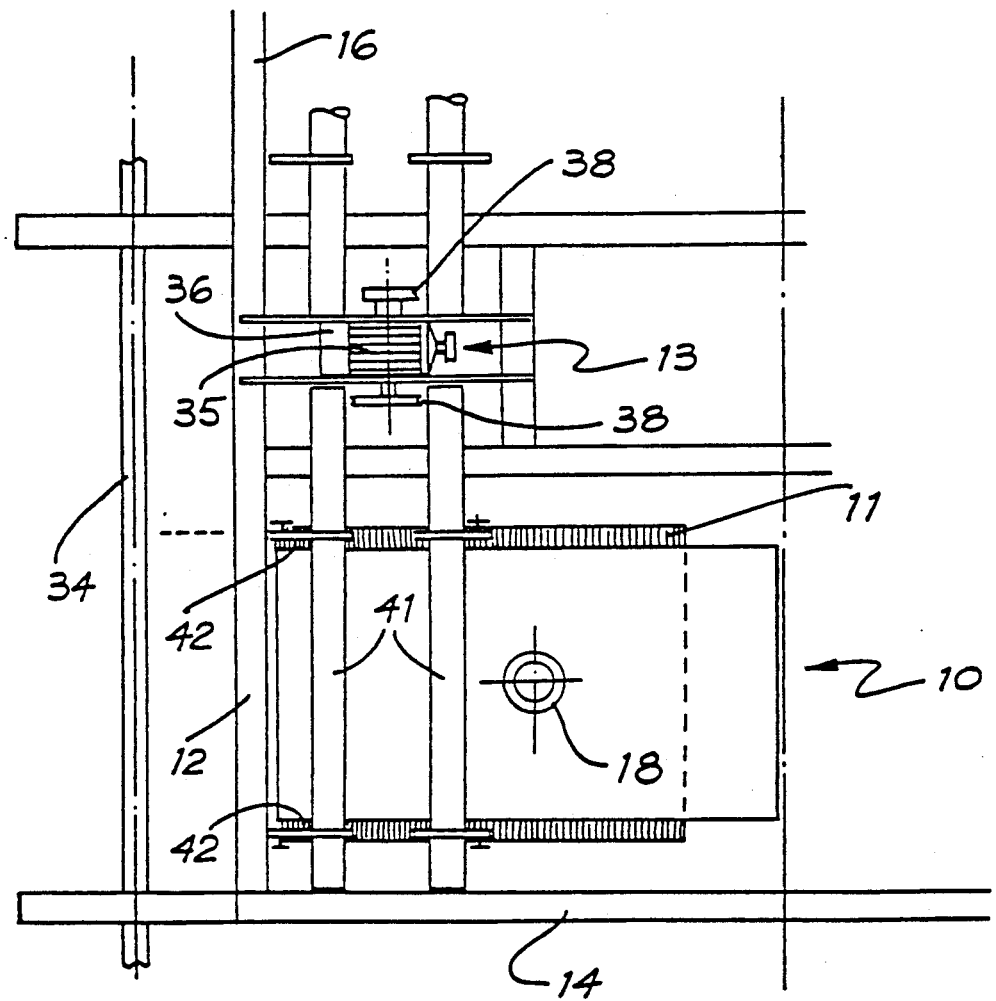
FIG. 2 is a schematic top plan view of the sieve screen deck of FIG. 1.

The sieve screen deck 10 of FIGS. 1 to 6 comprises an arcuate wedge wire screen 11 mounted on a frame indicated generally as 12 and a rapping mechanism 13 to apply a rapping and vibrating force to the wedge wire screen 11.

The frame 12 is mounted on a base frame 14 and includes vertical pillars 15 and horizontal beams 16. A distribution box 17 is supported on the pillars 15 and beams 16. This distribution box 17 is made according to Australian Patent Specification 546,426, the contents whereof are incorporated herein by reference, and includes a slurry receiving pipe 18 and a slurry discharge throat 19.

The screen 11 is positioned below the discharge throat 19 of the distribution box 17 and is adapted to receive on its upper end an even stream of influent slurry across its full width. The screen 11 is mounted on an arcuate cradle 21 which comprises a pair of parallel tubular end members 22 and 23 interconnecting a pair of parallel, tubular arcuate side members 24 and 25. At each end the screen 11 is connected to the cradle 21 by a rubber strip 26 (see FIG. 4) bolted to a respective one of the end members 22 and 23 and projecting through apertures in the screen 11 due to the removal of a small number of adjacent ones of the wedge wires 27 of the screen 11 adjacent each of its ends. The rubber strip 26 is provided in spaced apart array along its upper edge a plurality of vertical slots 28 each of which receives one of the backing bars 29 of the screen 11. The screen 11 is also formed with cast-in-situ polyurethane side walls 20.

The cradle 21 is pivotably and removably secured at its lower end to the frame 12 by pins 31 which extend laterally from the ends of each of the cradle end member 23. The upper end member 22 of the cradle 21 is provided with a longitudinally extending lug 32 which can be engaged by a bolt to connect the cradle 21 to the frame 12.

The cradle 21 and the attached sieve screen 11 may be removed from the frame 12 by removing the bolt holding the lug 32 to the frame 12, connecting a block and tackle 33 running on a monorail 34 to the lug 32, releasing the pins 31 from frame 12 and lifting the cradle 21 with the block and tackle 33. This feature allows rapid removal of the sieve screen 11 from the sieve screen deck 10 for replacement or repair.

The rapping mechanism 13 comprises an electric motor 35 which drives a gear box 36 by a belt drive 37. The gear box 36 drives a pair of cams 38 each of which is supported on one of a pair of spindles extending from each side of the gearbox 36.

Figure 3:
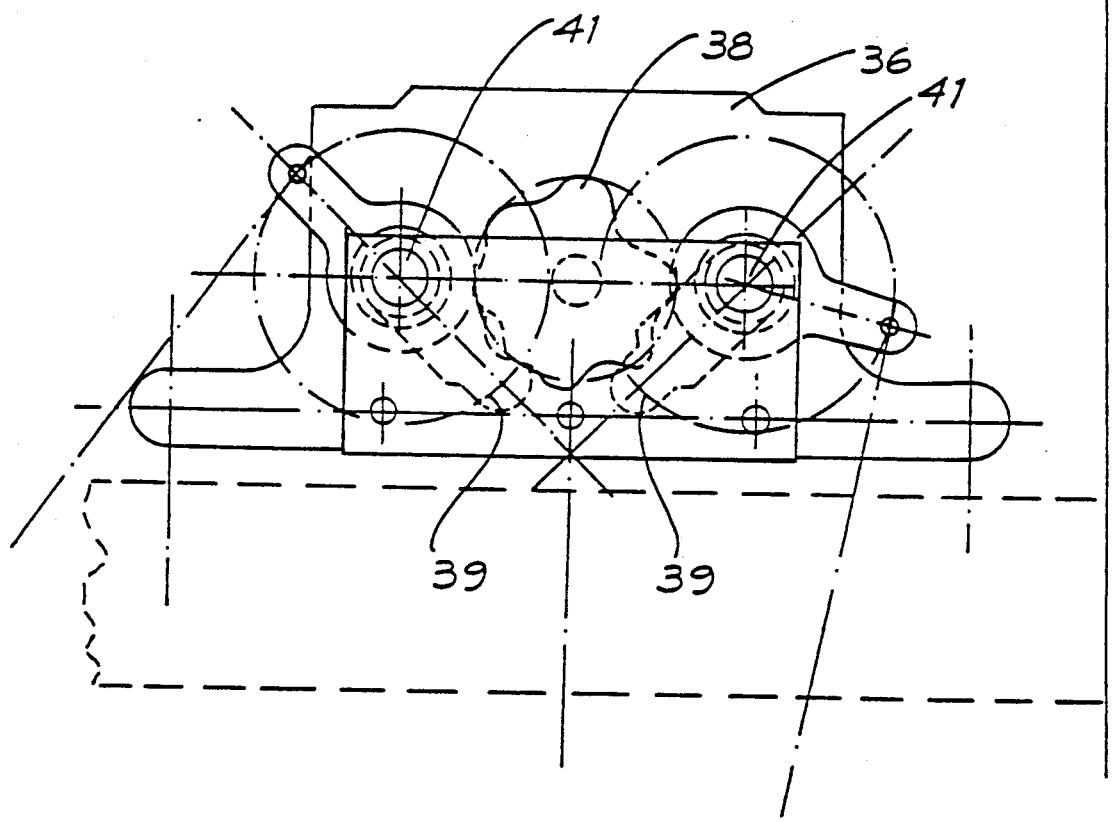
FIG. 3 is a schematic detailed elevational view of one of the cams and a pair of cam followers of the sieve screen deck of FIG. 1.
Figure 4:
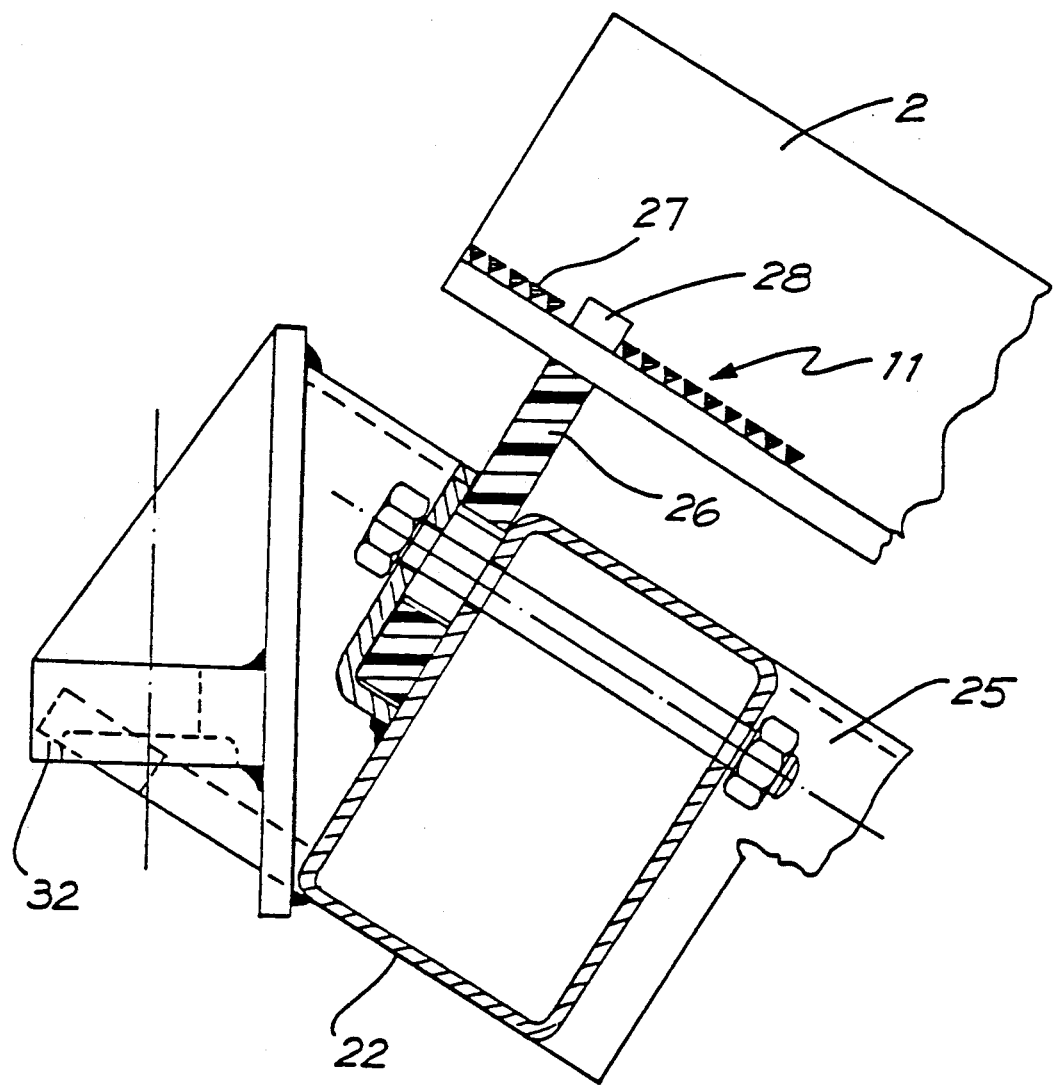
FIG. 4 is a vertical cross-sectional view through an end of the sieve screen and supporting cradle of the sieve screen deck of FIG. 1.
Figure 5:
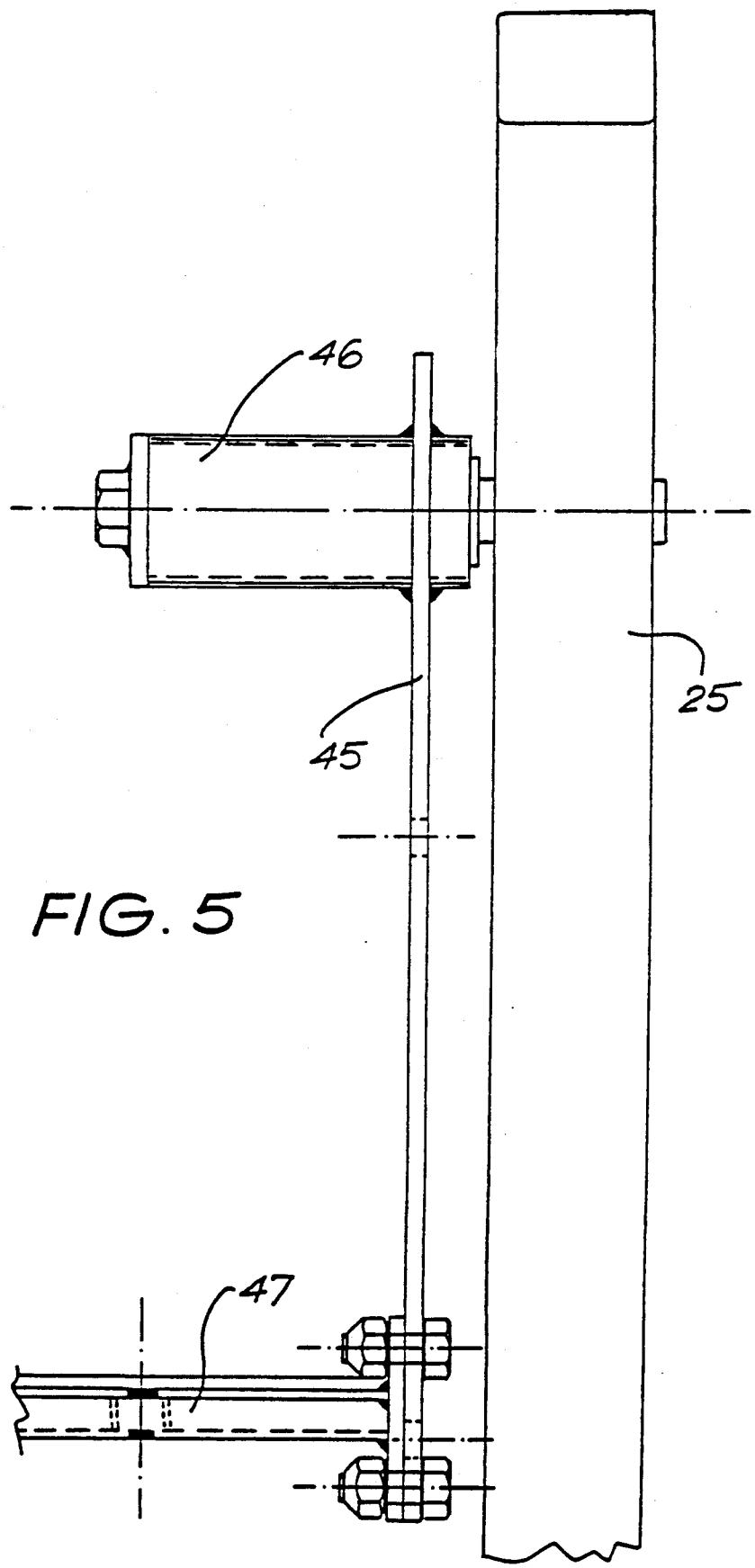
FIG. 5 is a plan view of a rapper arm and tension mount for the sieve screen deck of FIG. 1.
Figure 6:
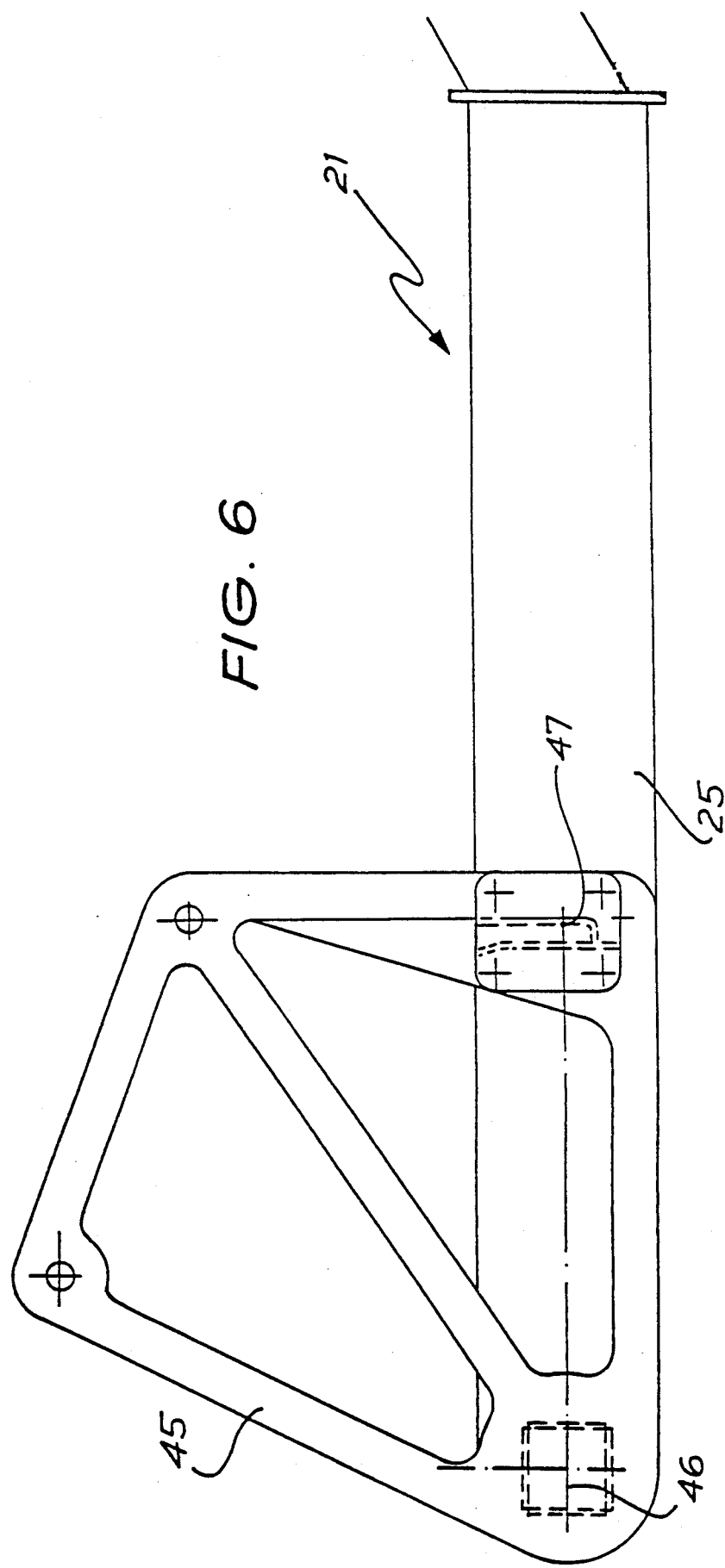
FIG. 6 is a top side elevational view of a rapper arm for the sieve screen deck of FIG. 1.

As is best seen in FIG. 3 each of the cams 38 has a radially outer cam surface which is undulating. A pair of cam followers 39 is mounted adjacent the cam 38 on rods 41 mounted in bearings (not shown) at either end thereof such that each rod may be rotated about its longitudinal axis under the influence of cam followers 39. Two arms 42 extend radially from each rod 41 at positions along each rod corresponding to the respective sides of the sieve screen 11 above which each rod 41 extends transversely of the longitudinal axis of the sieve screen 11. Each of the arms 42 is pivotably connected at its free end to a torsion rod 43 having turnbuckles 44 at each end such that its length may be adjusted. Each of the torsion arms 43 is pivotably connected to one of a pair of rapper arms 45 (see FIGS. 5 and 6). Each rapper arm is connected to one of the side members 24 and 25 of the cradle 21 by a torsion mount 46. The torsion arms 43 are interconnected by a rapping bar 47 comprising a U-shaped channel member holding a strip of a resilient rubber or plastics material.

A backstop channel 48 extends between the side members 24 and 25 of the cradle 21 at its mid point and carries a resilient strip of rubber or plastics material against which the underside of the sieve screen 11 rests.

Each motor 35 preferably drives, through gear box 36 a pair of cams 38. Each cam 38 preferably drives a pair of cam followers 39 the motion of each of which is used to rap a sieve screen deck 10. Thus a single motor can be used to drive four sieve screen decks 10. By appropriate relative positioning of cams 38 and cam followers 39 it can be ensured that the peak load on the motor 35 is not in excess of that which would apply if only a single rapping device were driven by it.

In use rotation of the motor 35 causes the cam 38 to rotate. The cam follower 39 follows the indentations of the cam surface and applies a vibrating and rapping force to the sieve screen 11 through the rod 41, arm 42, torsion rod 43 the rapping arms 45 and the rapping bar 48. At rest the sieve screen 11 rests back against the backstop 48. The cam surface of cam 38 includes a number of small undulations and one large indentation. The small indentations apply a regular vibrational force to the screen 11 while the one large indentation applies a much greater rapping force much less frequently. The flexible mountings for the screen 11 and its flexible side walls allow it to freely flex under the applied rapping or vibrating force. The positioning of the motor 35, gearbox 36, cam 38, cam followers 39 and torsion rods 43 above the sieve screen 11, and preferably above the distributor 17 as well, avoids these integers from coming into contact with the slurry passing over the sieve screen deck 10.

Figure 7:
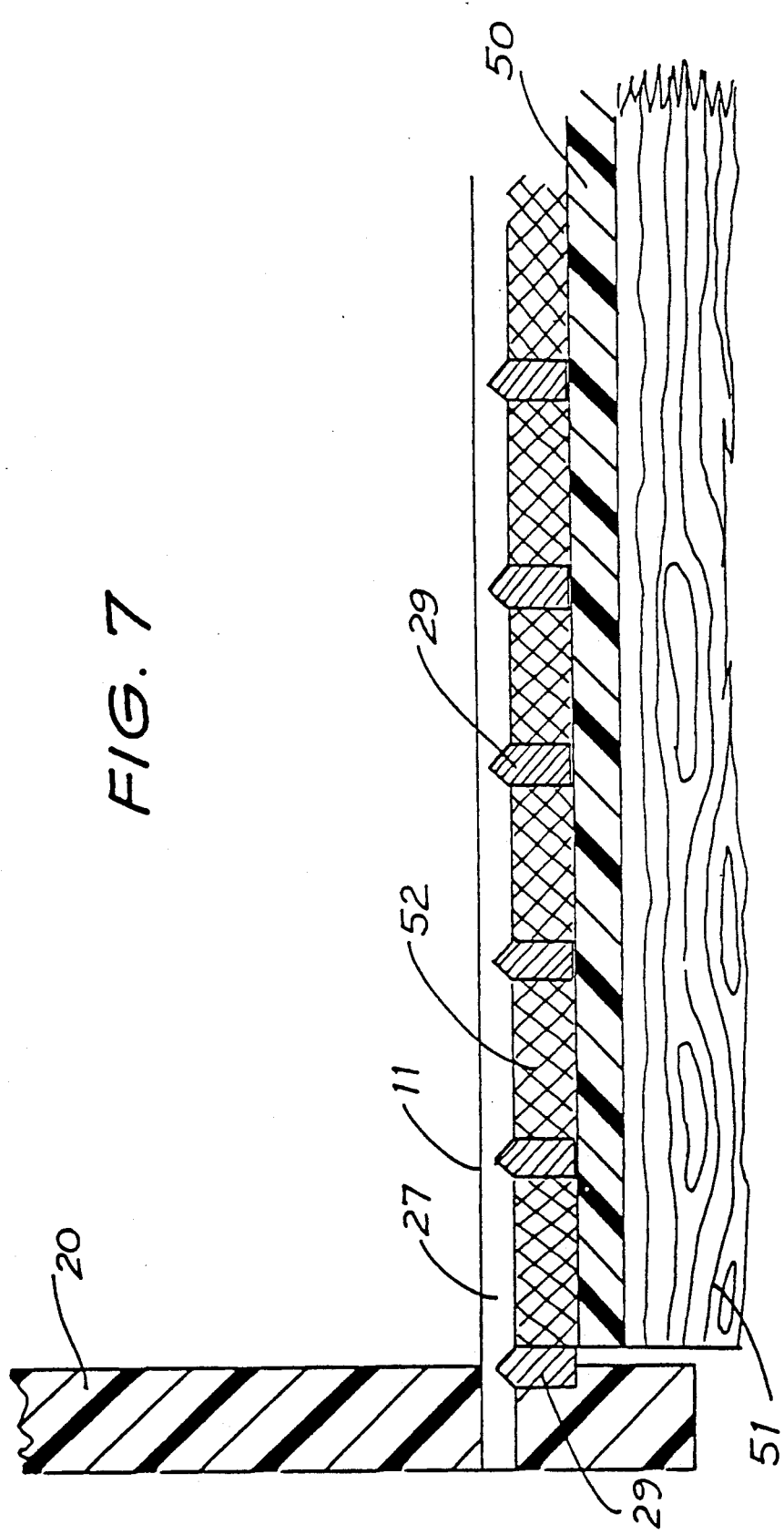
FIG. 7 is a cross-sectional view through part of the sieve screen showing the application of a strip of a resilient material to the underside of the sieve screen deck according to the second aspect of the present invention.

As is seen in FIG. 7 the sieve screen 11 preferably is formed on its undersurface with a rapping pad 50 to receive the rapping force applied by the rapping bar 47. It is preferred that the outer surface of the rapping pad 50 is planar such that the rapping bar can contact the pad 50 evenly across the full width of the sieve screen 11. In order to achieve this the pad 50 is preferably releasably adhered to a flat support such as a piece of wood 51 as by the use of a double sided adhesive tape. A bead or beads of a gap filling sealant such as Dow Corning silicone sealant No. 1080 or a polyurethane mastic sold under the trade mark "POLY-U-MASTIC" is applied to the surface of the pad 50 distal to the wood. The sealant carrying side of the pad 50 is then applied to the underside of the screen 50 such that the sealant 52 fully fills the gap between the screen 11 and the pad 50. As the outer surface of pad 50 is maintained planar by the wood 51 the sealant 52 will take up any undulations in screen 11. After the sealant 52 has cured the wood 51 may be gently pulled away from pad 50 leaving a planar surface of pad 50 against which the rapping bar may apply the rapping or vibrating force.

FIG. 8 shows a mineral processing circuit in which the sieve screen deck 10 or a similar deck may be used with advantage.

A coal slurry dredged from a coal tailings pond is fed over a screen 100 to remove all particles of greater than 1.7 mm. The water and particles of less than 1.7 mm are fed into a sump 101 where the slurry pulp density is adjusted to from 10-30% by weight solids, preferably 24%, and pumped by pump 102 into a hydrocyclone 103 which has an included cone angle of 15°. Oversize particles and smaller dense particles form the underflow having a pulp density of from 40 to 60% while the generally smaller particles and larger less dense particles form the overflow which is fed to a sump 104 forming part of a secondary treatment circuit. The underflow is repulped to a density of 20 to 50%, preferably 25%, and fed over a rapped or vibrated sieve screen deck 105 which has a radius of about 1.9 m, an arc angle of about 35° and a slot aperture of about 380 microns. The water and fines tend to flow through the screen 105 to produce an underflow which flows into sump 104. The particles having a size above about 250 microns will form an overflow from the sieve screen 105 having a pulp density of about 40 to 60%.

While the underflow from the hydrocyclone 103 is generally of larger particles it is contaminated with a proportion of smaller and denser particles which would normally end up in the final coal product stream and raise its ash content. By following the hydrocyclone 103 with a sieve screen deck 105 this contaminating proportion of smaller particles can be removed as the sieve screen deck 105 classifies solely on size with no allowance for density difference. The overflow stream from the sieve screen deck 105 thus comprises coal particles and gangue ash having a particle size of from approximately 250 microns to 1.7 mm.

The overflow stream from the sieve screen deck 105 is repulped in sump 106 to a pulp density of 20% and pumped by pump 107 to a bank of spiral separators 108 where the particles are separated by density into a product stream and a reject stream. The product stream is fed to a further bank of spiral separators 109 to clean the product stream and to produce a final product stream and a reject stream. The reject streams from spiral separators 108 and 109 are combined and conveyed, via sump 110 and pump 111 to a tailings dam. The final product stream from spiral separators 109 is dewatered on a sieve screen deck 112 similar to sieve screen deck 105 and the overflows fed directly to product storage or if desired to a centrifuge for further dewatering. The underflows from sieve screen deck 112 are directed to sump 104 where they join the underflows from the hydrocyclone 103 and the sieve screen deck 105.

The sump 104 feeds a fine particle separation circuit through pump 113. The pump 113 feeds a slurry of pulp density of about 25% to a hydrocyclone 114 of a smaller included cone angle than hydrocyclone 103. The overflow from hydrocyclone 114 is fed to sump 110 while the underflow having a pulp density of about 50% is repulped to 20% and fed over sieve screen deck 114a similar to sieve screen deck 105 except that the gap width is about 100 microns. The underflow from sieve screen deck 114a is fed to sump 110 while the overflow containing particles of above about 75 microns is fed to a sump 115 where it is repulped and fed by pump 116 to a bank of spiral separators 117. The product stream from spiral separators 117 is fed to cleaning spiral separators 118. The reject stream from each of these separators is fed to sump 110 while the final product stream 110 is fed to dewatering sieve screen deck (not shown) similar to 114.

If desired a hydrocyclones similar to the hydrocyclone 103 and 114 respectively may precede each of the dewatering sieve screen decks.

We claim:
1. A process for the treatment of coal tailings containing coal particles having a maximum dimension of less than 2 mm and gangue particles of a density greater than that of coal in order to recover the coal particles from the tailings, comprising the following steps in order:
    forming a slurry of the coal tailings having a pulp density of from 10 to 30% by weight;
    feeding the slurry into a hydrocyclone to produce an underflow stream containing substantially all of the tailing particles larger than a predetermined size and at least some of the gangue particles smaller than said predetermined size and an overflow stream containing substantially all of the coal particles smaller than said predetermined size and the balance of the gangue particles, the hydrocyclone being operated so that the underflow stream has a pulp density of from 40 to 60% by weight;
  adjusting the pulp density of the underflow stream, if required, to from 20 to 50% by weight;
  passing the repulped underflow stream over a vibrating sieve screen deck having a wedge wire sieve screen with a radius of less than 2 m, an arc angle of from 45° to 60° and a slot aperture of from 80 microns to 500 microns to form a coarse stream of particles substantially all having a particle size greater than 65 microns;
  adjusting the pulp density of the coarse stream of particles to from 20 to 50% by weight, and
  passing the repulped coarse stream over a spiral separator to bring about a substantial density separation of the coal particles from the gangue particles and recover the coal particles.

2. A process as claimed in claim 1 wherein said coal tailings contain substantially no particles having a maximum dimension larger than 1.7 mm.

3. A process as claimed in claim 1 wherein said slurry of the coal tailings has a pulp density of substantially 24% by weight.

4. A process as claimed in claim 1 wherein said hydrocyclone has an included angle of substantially 15°.

5. A process as claimed in claim 1 wherein said underflow stream is repulped to a pulp density of substantially 25% by weight.

6. A process as claimed in claim 1 wherein said sieve screen deck has a radius of about 1.9 m, an arc angle of substantially 35° and a slot aperture of substantially 380 microns.

7. A process as claimed in claim 1 and further comprising:
repulping said overflow stream to a pulp density of substantially 25%;
feeding said repulped overflow stream to a second hydrocyclone to produce a second underflow stream;
feeding said second underflow stream to a further vibrating sieve screen deck to form a further coarse stream;
repulping said further coarse stream; and
passing said repulped further coarse stream over a spiral separator to separate the coal particles from the gangue particles in said further coarse stream.

8. A process as claimed in claim 1 and further comprising:
dewatering said separated coal particles by passing them over a sieve screen deck and through a centrifuge.

* * * * *